United States Patent [19]

Gardner et al.

[11] Patent Number: 5,361,480
[45] Date of Patent: Nov. 8, 1994

[54] METHOD OF MAKING A TORQUE CONVERTER CLUTCH

[75] Inventors: Thomas H. Gardner, Englewood, Ohio; Raymond F. Fritz, Fredericksburg; Patrick J. Roberts, Ruther Glen, both of Va.

[73] Assignee: General Motors Corporation, Detroit, Mich.

[21] Appl. No.: 113,784

[22] Filed: Aug. 27, 1993

[51] Int. Cl.$^5$ .......................... B23Q 3/00; B25B 27/14
[52] U.S. Cl. ........................................ 29/467; 29/274; 29/416
[58] Field of Search .............. 29/412, 415, 416, 432.1, 29/432.2, 434, 467, 468, 469.5, 274, DIG. 1, DIG. 24, DIG. 37; 156/245; 188/251 A; 192/70.11, 70.14, 70.16, 70.19; 219/10.41

[56] References Cited

U.S. PATENT DOCUMENTS

| 3,718,796 | 2/1973 | Schade et al. | 219/10.41 |
| 4,260,047 | 4/1981 | Nels | 192/70.14 |
| 4,910,856 | 3/1990 | Watanabe | 29/274 X |
| 5,054,186 | 10/1991 | Weselak | 29/434 X |

FOREIGN PATENT DOCUMENTS

| 163827 | 9/1983 | Japan | 29/274 |
| 2124239 | 5/1990 | Japan | 29/274 |

Primary Examiner—Peter Dungba Vo
Attorney, Agent, or Firm—Donald F. Scherer

[57] ABSTRACT

An apparatus is provided for use in a method of making a torque converter clutch. The torque converter clutch is comprised of an annular clutch plate to which is secured or bonded an annular friction surface. The annular friction surface is formed on the machine by die-stamping, from a flat sheet of friction material, successive arcuate segments. Each arcuate segment is stamped into a holding ring which is indexed to accept the next successive segment until a full annulus is provided. The holding ring is transported to a stripper station. Simultaneous with the stamping, the annular clutch plate is heated and transported to the stripper station. When both components are in the stripper station, the friction annulus is stripped from the holding ring onto the heated clutch plate. The clutch plate and attached friction annulus are discharged from the machine. Simultaneous with the stamping, the offal of the sheet of friction material is cut transversely and longitudinally for discharge into an egress channel.

3 Claims, 6 Drawing Sheets

5,361,480

METHOD OF MAKING A TORQUE CONVERTER CLUTCH

TECHNICAL FIELD

This invention relates to the manufacture of clutch plates, and more particularly, to a method of manufacturing a torque converter clutch plate. Specifically, this invention relates to a stamping process for developing an annular friction plate from a plurality of segments.

BACKGROUND OF THE INVENTION

Clutch plates are generally manufactured with an annular metal backing plate to which is secured an annular friction member. As taught U.S. Pat. No. 4,260,047 to Nels, issued Apr. 7, 1981, and assigned to the assignee of the present invention, it is known to stamp successive quadrants which are secured together with a tab and slot arrangement to form the annular friction member.

With conventional transmission clutches, which are of relatively small diameter, the annular friction members can be transported from one machine to another or stored in inventory without the tab and slot arrangement disengaging. However, when this process is attempted with larger annular rings, such as those required for torque converter clutches, the resulting annulus is too frangible, such that storage and transportation of the friction material alone is not viable.

To overcome this drawback, it has been proposed to blank each segment directly onto the clutch pressure plate. However, significant difficulties were found in attempting to align the adjacent friction segments. Thus, a great deal of scrap or rework is required with this method.

It has also been considered that a complete ring could be stamped from a sheet of material. However, this process results in a great deal of waste and the friction material is expensive.

SUMMARY OF THE INVENTION

To overcome the disadvantages of the prior art, the present invention proposes to die-stamp annular segments from sheet material into a holding ring which is indexed to accept the adjacent segments. The indexing of the holding ring can be accomplished with a great deal of accuracy, such that a tab and slot construction is possible. The friction annulus disposed in the holding ring is transported intact to a loading and stripping station where it is presented above a heated clutch pressure plate, and a stripper operation is performed to expel the annular friction disc onto the proper location.

It is therefore an object of this invention to provide an improved method of making a torque converter clutch, wherein an annular friction disc is manufactured and transported for installation on a clutch plate without intervening storage of the annular friction disc.

It is another object of this invention to provide an improved method of manufacturing a torque converter clutch, wherein annular segments of friction material are stamped from a flat sheet into a holding ring which is indexed to accept subsequent segments until a complete annulus is constructed, and further wherein, the completed annulus and holding ring are transported to a stripper station wherein the annulus is stripped from the holding ring onto a heated metal clutch plate.

It is another object of this invention to provide an improved method of manufacturing a torque converter clutch, wherein the annular friction member is created, as described above, and wherein, the flat sheet of friction material passes a cutting station where the offal thereof is sliced transversely and longitudinally prior to ejection into an offal egress chute.

These and other advantages of the present invention will be more apparent from the following description and drawings.

DESCRIPTION OF THE EXEMPLARY EMBODIMENT

Figure 1:
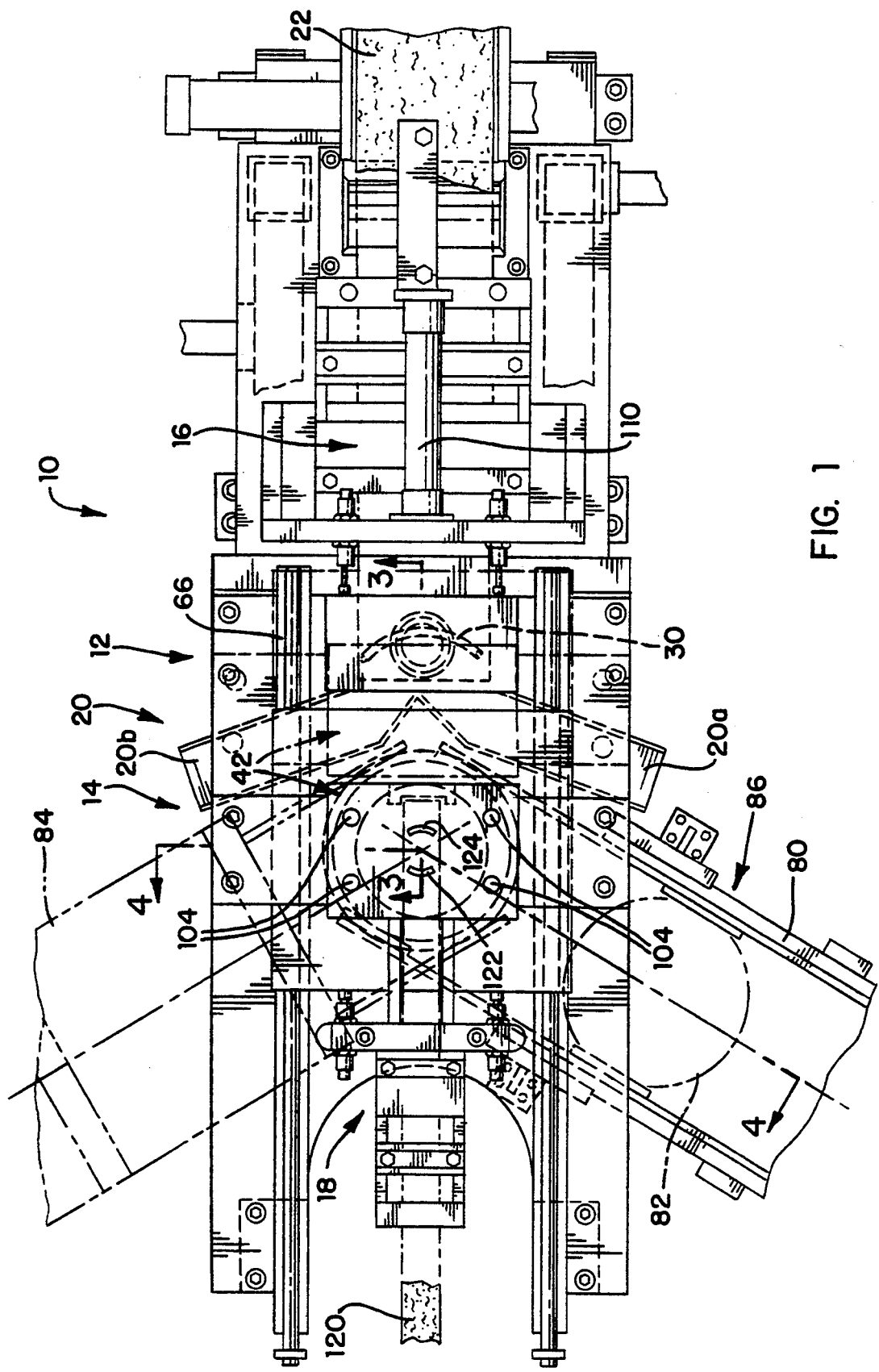
FIG. 1 is a top view of a portion of an apparatus utilized in performing the method of manufacture of the present invention.
Figure 2:
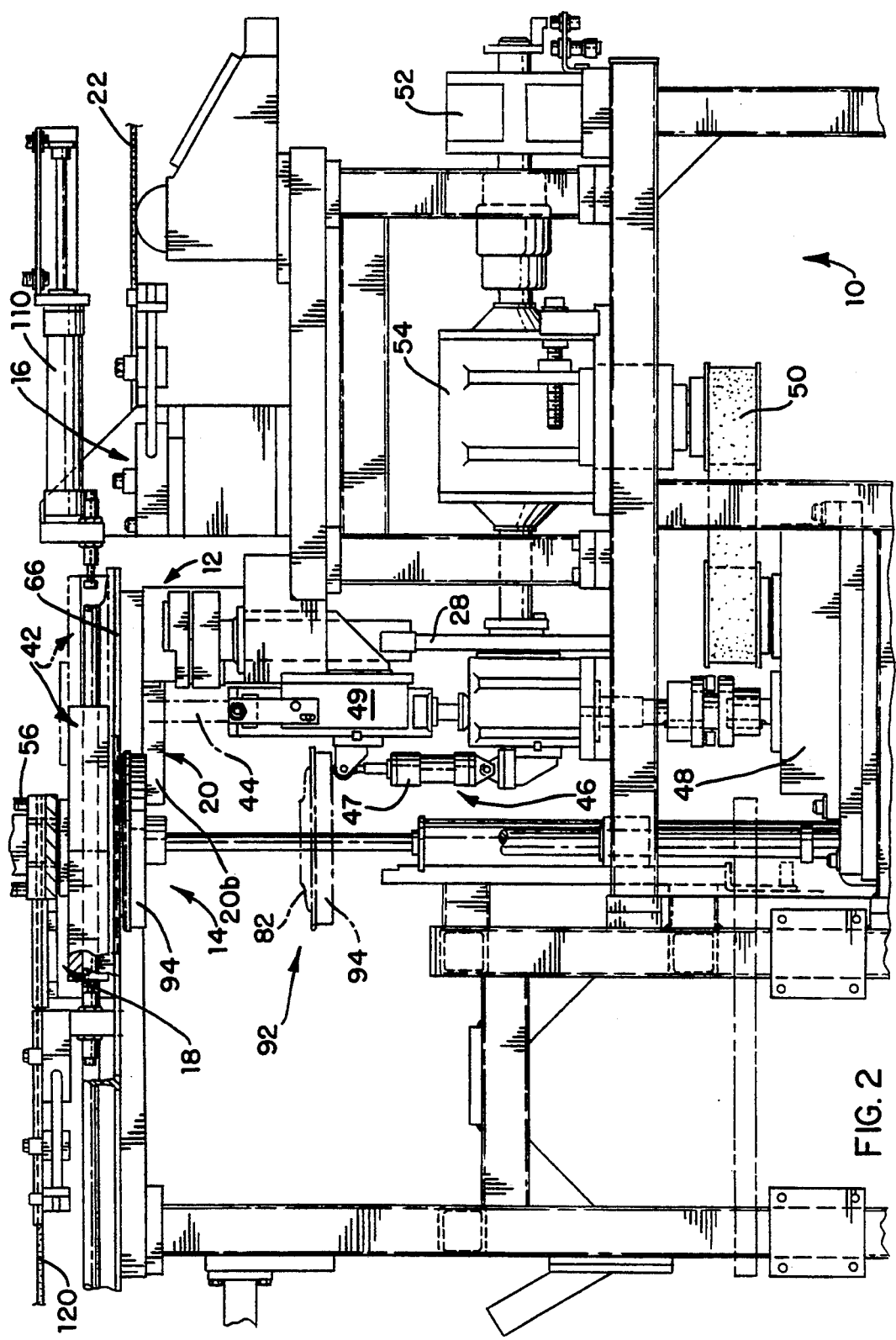
FIG. 2 is an elevational view of the apparatus shown in FIG. 1.

Referring to the drawings, particularly FIGS. 1 and 2, there is seen a clutch making machine or apparatus, generally designated 10, which includes a die cutting and stamping station 12, a load and stripper station 14, a pair of material feed stations 16 and 18, and an offal discharge station or chute 20.

Figure 3:
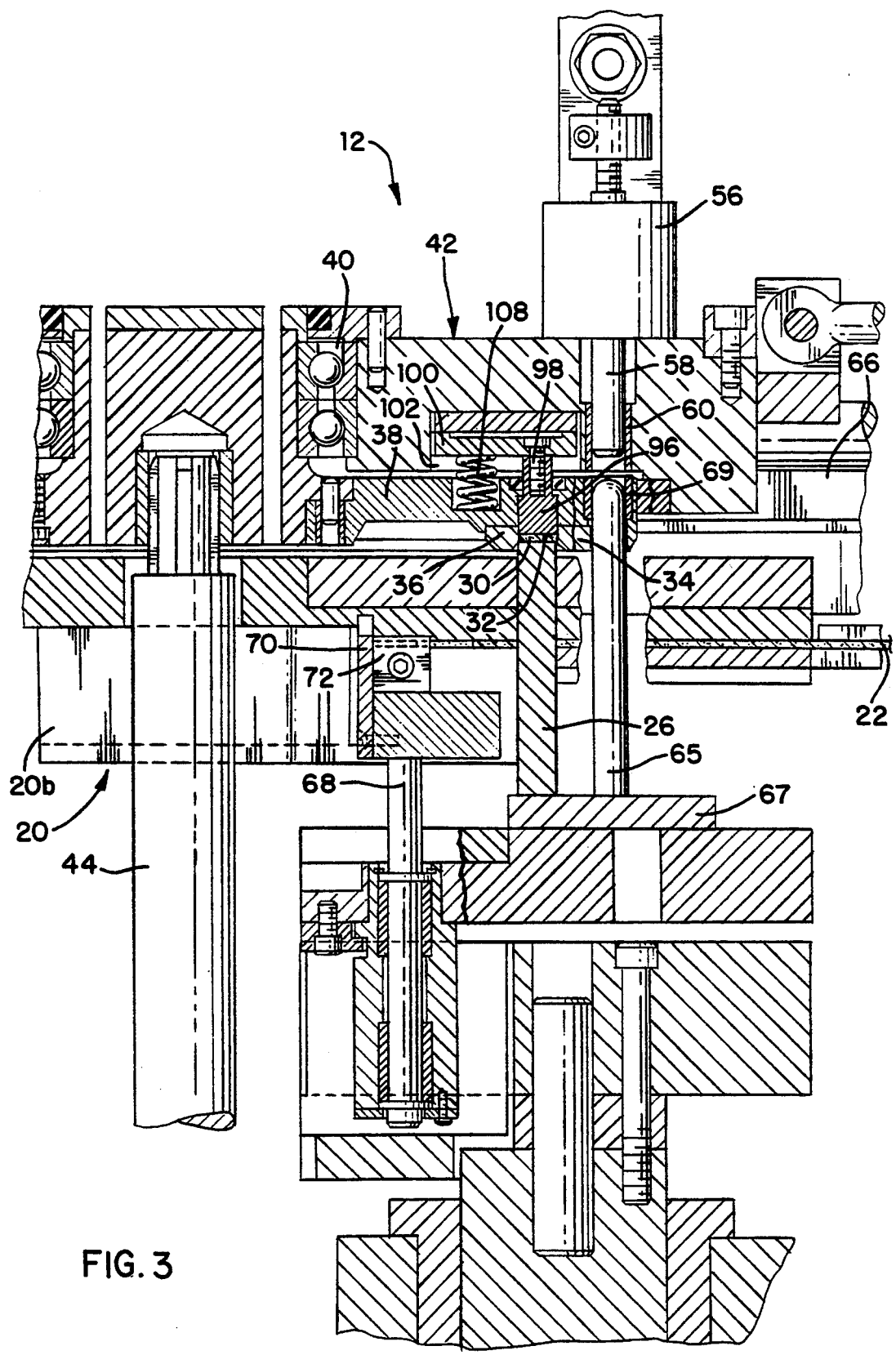
FIG. 3 is a view taken along line 3—3 of FIG. 1.
Figure 4:
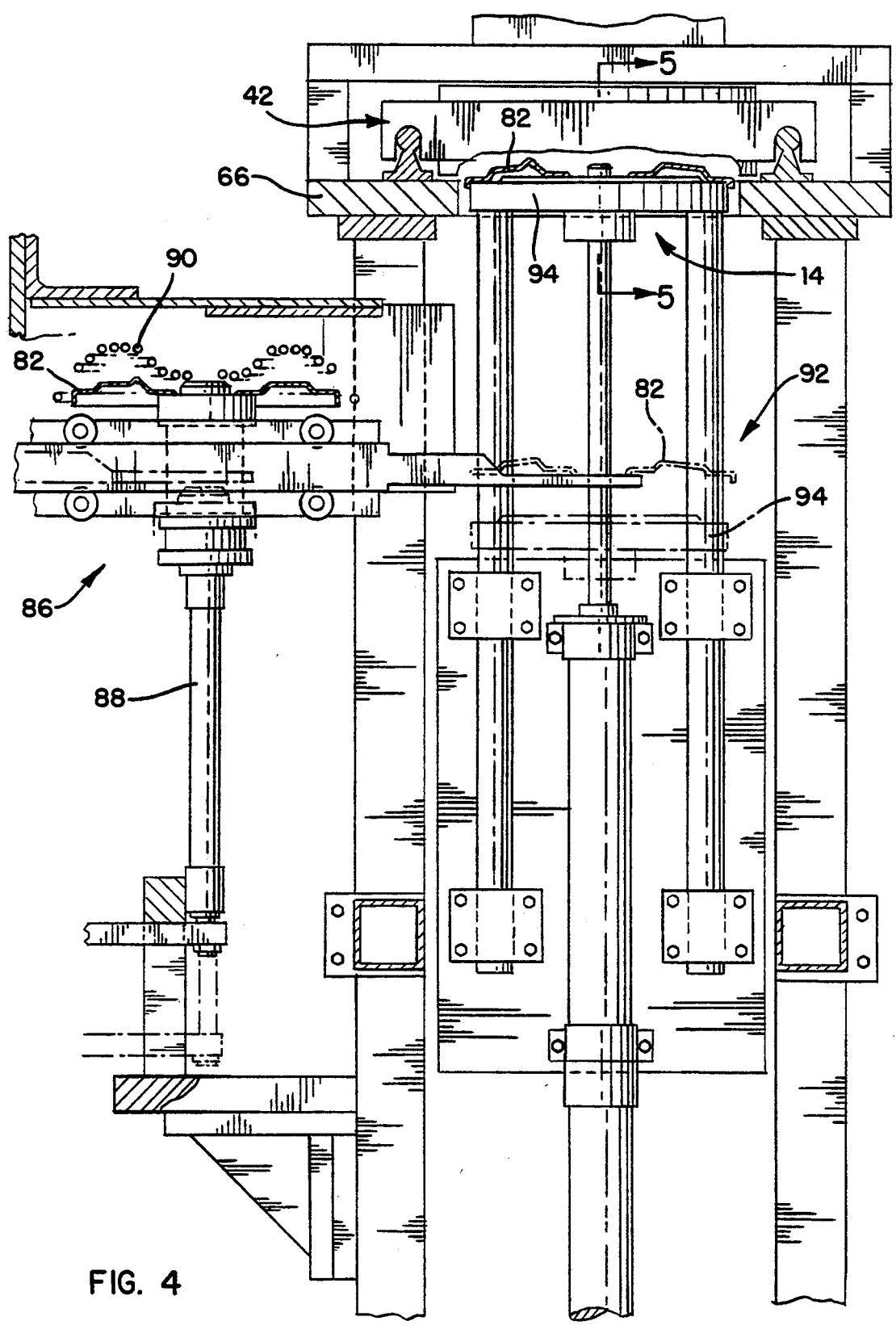
FIG. 4 is a view taken along line 4—4 of FIG. 1.

The feed station 16 transports a sheet of friction material 22 to the stamping station 12, wherein an arcuate segment 30 is stamped or die cut therefrom. The stamping station 12 has a die punch 26, as best seen in FIG. 3, which is projected upwardly by a die cam 28 disposed on the apparatus 10. The die punch 26 cuts the arcuate friction segment 30 from the sheet 22 and places the segment 30 in a holding ring or recess 32 formed between a pair of ring members 34 and 36.

The ring members 34 and 36 are secured to a rotatable table 38 which is supported on ball bearings 40 in a carriage 42. The table 38 is driven by a rotary shaft 44 which is operated in vertical orientation by a lift mechanism 46 comprised of a power cylinder 47 and a bearing housing 49. The rotating shaft 44 is driven by a conventional Geneva drive, not shown, which is disposed in a housing 48 on the apparatus 10.

The Geneva drive is driven by a conventional cog belt drive 50 which rotates in response to input motion from a conventional rotary actuator 52 through a 1-2 gear ratio mechanism 54. The rotary actuator 52 is also operable through a shaft 55 which drives the die cam 28.

The die cam 28 is effective to cause linear motion of the die punch 26 which, as previously described, is operable to stamp the friction segment 30. The Geneva drive and the shaft 44 are effective to index the table 38, such that the subsequent segment of material 22 will be deposited in the ring 32 in proper orientation with the previous segment.

As is well known, Geneva drive mechanisms permit the output to be stationary for a predetermined rotation of the input, thus, continuous rotation of the rotary actuator 52 is possible. This permits substantially continuous operation of the apparatus 10.

Figure 5:
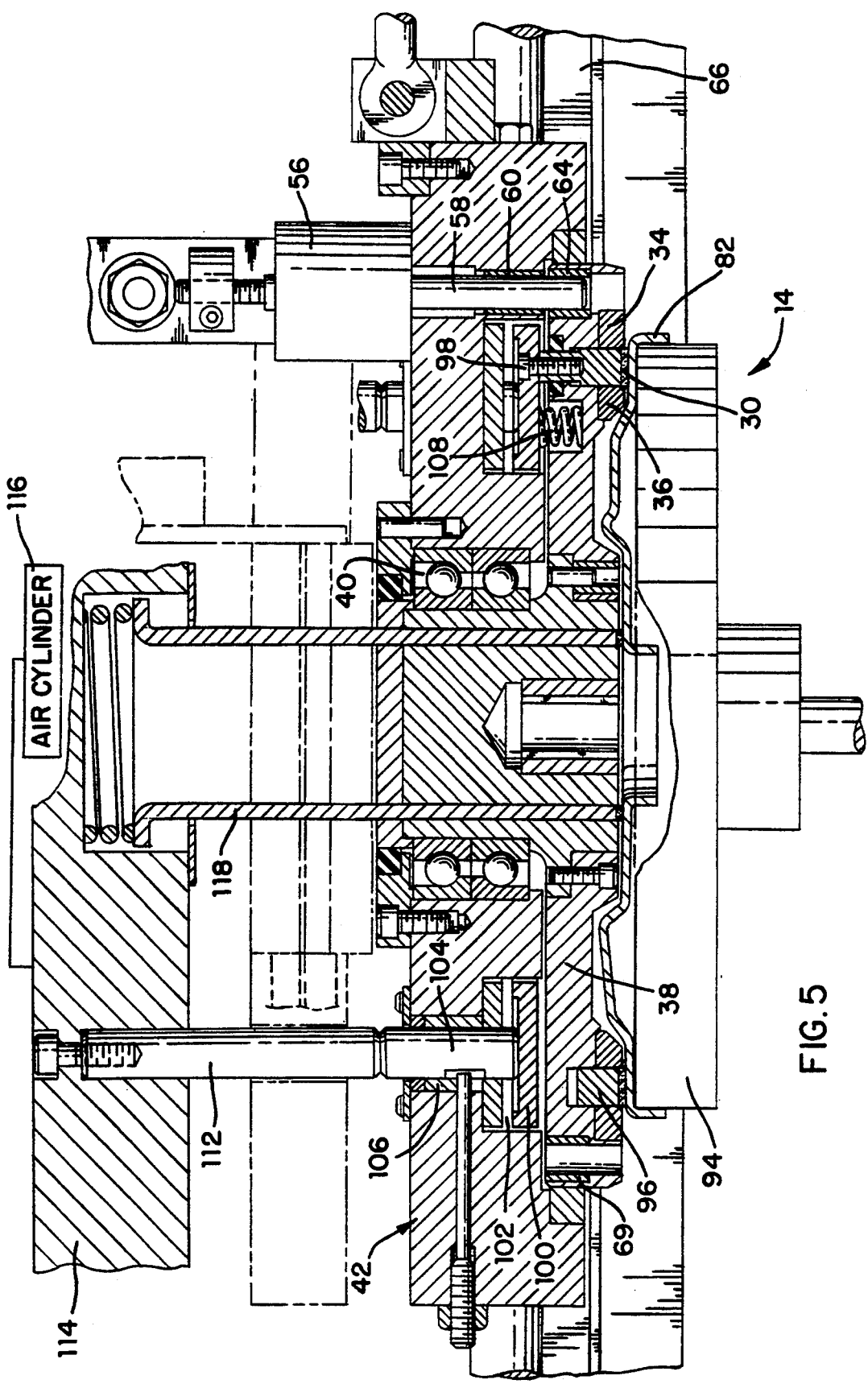
FIG. 5 is a view taken along line 5—5 of FIG. 4.

As best seen in FIG. 5, the carriage 42 has mounted thereon a locating assembly 56 comprised of a conventional air cylinder and a locating pin 58. The locating pin 58 is slidably disposed in a bushing 60 secured in the carriage 42, and upon extension, is engageable in a bushing 64 secured in the table 38. The locating assembly 56 assures the proper positioning of the table 38 during travel to and from the stripping station.

In FIG. 3, it can be seen that a pin 65 extends upwardly from a plate 67 supporting the punch 26. The pin 65 engages a bushing 69 before the punch 26 cuts or stamps the segment. This permits the use of a relatively inexpensive Geneva drive and rotary cam mechanism, since the bushing 69 and the pin 65 can be maintained at close tolerances to establish the table position. If desired, two or more pins 65 and bushings 69 can be utilized.

The carriage 42 is linearly movable on a table 66 such that upon completion of a friction annulus, the carriage 42 can be moved from the stamping station to the loading and stripper station.

The mechanism which actuates the die punch 26 is also effective to cause linear actuation of a cutoff punch assembly 68. The cutoff punch assembly 68 has a transverse knife or cutting blade 70 and a longitudinal knife or cutting blade 72. The blade 70 is effective, as best seen in FIG. 7, to cut the sheet material 22 transversely along a line 74, and the blade 72 is effective to provide a longitudinal cut in the sheet material 22 along a line 76.

Figure 7:
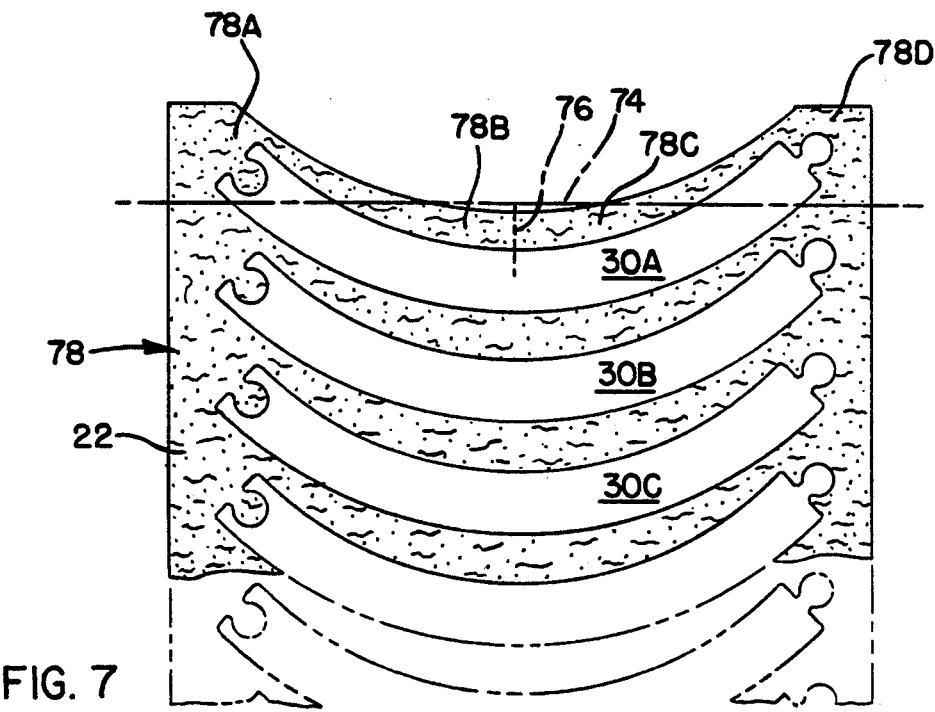
FIG. 7 is a plan view of a sheet of friction material from which the friction segments have been die-stamped.

As seen in FIG. 7, the sheet material 22 has an offal portion 78 from which successive segments 30a, 30b and 30c have been removed. The offal 78 must be discharged from the machine, and it has been found that attempting to discharge the offal with only a transverse cut is unsatisfactory.

The transverse blade 70 and longitudinal blade 72 are effective to provide four pieces of offal 78a, 78b, 78c and 78d. The offal pieces 78a and 78b are discharged through the offal chute 20a and the remaining two pieces are discharged through the offal chute 20b. This discharge process has been found to prevent clogging of the offal in the discharge chute.

The apparatus 10 also has a load chute 80 for directing clutch pressure plates 82 to the load and stripper station 14. An egress chute 84 is provided to remove clutch plate assemblies from the machine 10.

Prior to entering the stripper station 14, the pressure plate 82 passes through a heating station 86 where a lift mechanism 88 raises the plate 82 into close proximity with an induction heating coil 90. The heating coil 90 will rapidly heat the surface of the pressure plate 82.

After passing through the heating station 86, the clutch plate is transported to a load station 92 where it is mounted on a load table 94 and presented to the stripper station 14.

When the friction annulus is completed, the shaft 44 is withdrawn by the lift mechanism 46 and the locating pin 58 is simultaneously engaged in the bushing 64. This retains the proper orientation of the table 38 for the spline of the shaft 44 when the carriage 42 returns to the station 12 for the cycle to be repeated.

In the stripper station 14, the table 94 and clutch pressure plate 82 are brought into close proximity with the rings 34 and 36 of the table 38. The table 38 has disposed therein a stripper ring 96 which is disposed in the recess 32. The stripper ring 96 is secured by threaded fasteners 98 to a stripper plate 100 which is disposed in a recess 102 formed in the carriage 42. The stripper plate 100 is disposed in abutting relation with four stripper pins 104, which are slidably disposed in bushings 106, secured in the carriage 42. The stripper plate 100 is urged upward into the recess 102 by a plurality of compression springs 108.

When the carriage is positioned at the stripper station by an air cylinder 110, the stripper ring 96 is in the spring set position, shown in FIG. 3. Thus, the friction segments 30 are disposed out of contact with the clutch plate 82.

To force the annulus formed by the friction segments 30 into abutting relation with the clutch plate 82, the stripper pins are forced downward against the compression springs 108 by actuator pins 112 which are controlled by a load bar 114 and an air cylinder 116. Thus, the stripper pins 104, stripper plate 100 and stripper ring 96 will be effective to force the friction ring into abutment with the clutch plate 82.

The friction material in the sheet 22 has an adhesive deposited thereon, such that it will come in contact with the surface of the clutch plate 82. The adhesive becomes active with the elevated temperature of the plate 82, such that the stripper ring 96 can be withdrawn or retracted and an annular friction disc will be bonded to the plate 82.

Simultaneous with the load bar 114 being urged downward, an inner segment punch 118 operatively connected therewith is forced through a sheet of inner segment material 120. The punch 118 die cuts a pair of segments 122, 124, which are also deposited on the clutch plate 82 simultaneously with the friction segments 30. The inner segment material is disposed on the clutch plate 82 to prevent metal-to-metal contact between the inner hub of the plate 82 and an input shell of the torque converter which will be disposed adjacent thereto at assembly.

Figure 6:
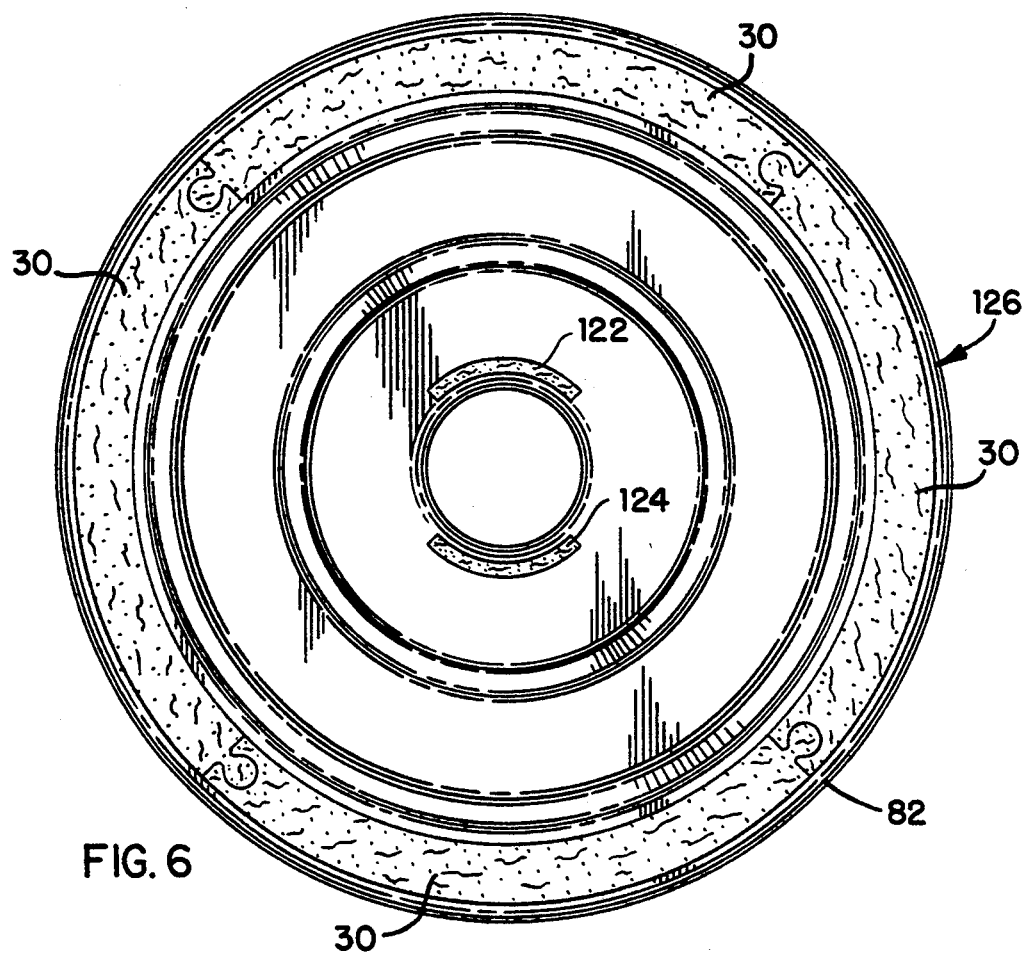
FIG. 6 is an elevational view of a completed torque converter clutch.

The clutch plate 82 and the annular segments 30 define a component of a torque converter clutch 126, as shown in FIG. 6. As seen in FIG. 6, four of the segments 30 are combined to provide a complete annulus. It is believed that making each annular segment a 90 degree segment is the most efficient use of the friction material of sheet 22. It is, of course, possible to utilize more or less annular segments in the production of a torque converter clutch.

The present invention preferably begins with a strip of friction material approximately $8\frac{1}{4}$ inches wide by 0.040 inches thick, stored in a roll and laminated with adhesive to one side, which is satisfactory for a clutch facing having an outer diameter of approximately $11\frac{1}{8}$ inches. The material is fed into the die. The rotary actuator 52, Geneva mechanism, rotating shaft 44 and die cam 28 are effective to stamp arcuate pieces from the material 22 for disposition in the holding ring 32 until a complete annulus is formed.

The rotary actuator 52 rotates and drives the cam 28 which causes the punch 26 to rise and stamp friction material in annular segments. At the same time, the rotary actuator 52 rotates the Geneva mechanism which drives rotary cam 46 in 90 degree increments of rotation.

Feeder station 16 indexes the sheet material 22 for each segment. After the first piece of friction material rotates 90 degrees in the carriage 42, another piece of friction material is stamped. This process continues until a full ring of friction material is formed in the recess 32 in the carriage.

Simultaneously, the pressure plate 82, which is automatically loaded, passes an induction heat coil 90 which is heated to 250 degrees F. The ring of friction material and carriage advance to the load position vertically above the pressure plate 82. The pressure plate is then lifted until it engages the carriage.

At that time, the die punch 118 stamps two inner segments 122 and 124 onto the pressure plate. The load bar 114 and die punch 118 are operated by the air cylinder and stroked downward to press the inner segments onto the pressure plate and strip the friction material out of the carriage. Due to heat, the adhesive on the material adheres to the pressure plate. The torque converter clutch is lowered to a conveyor system for egress.

The offal 78 is formed as each 90 degree segment is stamped. Cutters 70 and 72 slice the offal 78 transversely and longitudinally for disposition into the offal discharge chutes 20a and 20b. A vacuum system assists in discharging the offal from the stamping die.

The embodiments of the invention in which an exclusive property or privilege is claimed are defined as follows:

1. A method of making a torque converter clutch comprising the steps of:
    (a) stamping an arcuate segment of friction, material with interlocking means for connecting adjacent segments formed therein from a sheet of friction material into a position in a holding ring;
    (b) indexing the holding ring to present a position into which a subsequent segment is to be placed;
    (c) repeating steps (a) and (b) until a full friction annulus formed of arcuate segments interconnected by said interlocking means is completed in the holding ring;
    (d) transferring the holding ring with the friction annulus therein to a stripper station;
    (e) heating a surface of a clutch plate;
    (f) positioning the heated clutch plate under the holding ring in the stripper station;
    (g) strip the friction annulus from the holding ring onto the clutch plate to form a torque converter clutch; and
    (h) ejecting the torque converter clutch.

2. A method of making a torque converter clutch comprising the steps of:
    (a) stamping an arcuate segment of friction material with interlocking means for connecting adjacent segments formed thereon from a sheet of friction material into a position in a holding ring;
    (b) indexing the holding ring to present a position into which a subsequent segment is to be placed;
    (c) repeating steps (a) and (b) until a full friction annulus formed of arcuate segments interconnected by said interlocking means is completed in the holding ring;
    (d) transferring the holding ring with the friction annulus therein to a stripper station;
    (e) heating the surface of a clutch plate;
    (f) positioning the heated clutch plate under the holding ring in the stripper station;
    (g) stripping the friction annulus onto the clutch plate and simultaneously die punching a plurality of inner friction segments onto the clutch plate from an additional strip of material; and
    (h) ejecting the torque converter clutch.

3. A method of making a torque converter clutch comprising the steps of:
    (a) stamping a quarter circle arcuate segment of friction material with interlocking tab and slot means for interconnecting adjacent ones of the arcuate segments from a sheet of friction material into a predetermined position in a holding ring and simultaneously cutting an offal portion of said sheet of friction material transversely and longitudinally for discharge into a chute;
    (b) indexing the holding ring from the predetermined position to present a vacant position into which a subsequent arcuate segment will be placed;
    (c) repeating steps (a) and (b) until a full friction annulus of four interlocked arcuate segments is formed in the holding ring;
    (d) transferring the holding ring with the friction annulus therein to a stripper station;
    (e) heating the surface of a clutch plate;
    (f) positioning the heated clutch plate under the holding ring and friction annulus in the stripper station;
    (g) strip the friction annulus from the holding ring onto the clutch plate to form a torque converter clutch; and
    (h) ejecting the torque converter clutch.

* * * * *